(12) United States Patent
Zurek

(10) Patent No.: US 7,779,041 B2
(45) Date of Patent: Aug. 17, 2010

(54) ANONYMIZING INFOCUBE DATA

(75) Inventor: Thomas Zurek, Walldorf (DE)

(73) Assignee: SAP AG, Walldorf (DE)

( * ) Notice: Subject to any disclaimer, the term of this patent is extended or adjusted under 35 U.S.C. 154(b) by 725 days.

(21) Appl. No.: 11/799,814

(22) Filed: May 2, 2007

(65) Prior Publication Data

US 2008/0275900 A1     Nov. 6, 2008

(51) Int. Cl.
*G06F 17/30* (2006.01)
(52) U.S. Cl. ...................................... 707/796; 707/809
(58) Field of Classification Search .................. 707/1–7, 707/9–10, 100–102; 713/168, 179
See application file for complete search history.

(56) References Cited

U.S. PATENT DOCUMENTS

| | | | |
|---|---|---|---|
| 6,636,870 B2 * | 10/2003 | Roccaforte | 707/104.1 |
| 6,950,948 B2 * | 9/2005 | Neff | 705/12 |
| 7,360,094 B2 * | 4/2008 | Neff | 713/179 |
| 2005/0262087 A1 * | 11/2005 | Wu et al. | 707/9 |
| 2008/0255924 A1 * | 10/2008 | Chien et al. | 705/10 |
| 2009/0228430 A1 * | 9/2009 | Berger et al. | 707/2 |

* cited by examiner

*Primary Examiner*—Debbie Le
(74) *Attorney, Agent, or Firm*—Mintz, Levin, Cohn, Ferris, Glovsky and Popeo, P.C.

(57) ABSTRACT

In one aspect, in a computer-implemented method may make data anonymous, so that the data may be used during testing. The method may include receiving, from a user interface, an indication of a type of shuffling to be performed on data. Moreover, the data may be shuffled based on the received indication of the shuffling type. The shuffling may rearrange the data to make the data anonymous. The shuffled data may be provided to an application. Related systems, apparatus, methods, and/or articles are also described.

17 Claims, 4 Drawing Sheets

ANONYMIZING INFOCUBE DATA

FIELD

This disclosure relates generally to data processing, and, more particularly, to handling events associated with a query.

BACKGROUND

For the modern enterprise, maintaining data consistency with respect to data originating from a variety of data sources is strategically important to the enterprise. This requirement may be achieved by implementing a data warehouse. To that end, SAP's Business Warehouse (BW) system consolidates data (e.g., external and the internal sources of data) into a single repository. Moreover, the BW provides preconfigured data and methods to aid a business enterprise when dealing with data management and archiving.

One aspect of the BW is the infocube (physically represented as a "star" schema or a "snowflake" schema). Infocubes are multidimensional data storage containers for reporting data and for analyzing data.

FIG. 4 depicts an example of an infocube. The infocube is a database framework (or architecture) including a central database table (referred to as a "fact table"). The fact table may include so-called "key figures" representative of data of interest. The fact table may be surrounded by associated "dimension" tables. The dimension tables include references pointing to master data tables including so-called "characteristics" assigned to the key figures. A dimension table may be used as a simple grouping of characteristics that do not necessarily have hierarchical dependencies. For example, characteristics that logically belong together (district and area, for example, belong to a regional dimension) may be grouped together in a dimension. By adhering to this design criterion, dimensions are largely independent of each other, and dimension tables remain small with regards to data volume, which may be desirable for reasons of performance.

Frequently, customers want changes to a BW system (e.g., SAP's NetWeaver BI) to be tested on actual, production data. Testing may, in some cases, be performed by either in-house personnel (e.g., staff employed by the customer) as well as external personnel (e.g., by a hardware or a software vendor or a third party consultant). In all cases, using actual, production data in testing may result in sensitive information (e.g., personal medical information, financial information, and the like) being provided to people who should not have access to the sensitive data.

To prevent the disclosure of sensitive information, one approach is to require everyone handling the actual, production data to sign a confidentiality agreement prohibiting disclosure of the sensitive information. However, even with confidentiality agreements, one cannot guarantee that the actual, production data is kept in confidence. For example, an inadvertent disclosure of information during testing would result in the compromise of the sensitive information. Alternatively, instead of using actual, production data, artificial data may be used during testing. But using artificial data may limit the effectiveness of testing. Accordingly, there continues to be a need to provide mechanisms to provide meaningful test data during testing.

SUMMARY

The subject matter disclosed herein provides methods and apparatus, including computer program products, for shuffling data to make the data anonymous.

In one aspect, in a computer-implemented method, the method may include receiving, from a user interface, an indication of a type of shuffling to be performed on data. Moreover, the data may be shuffled based on the received indication of the shuffling type. The shuffling may rearrange the data to make the data anonymous. The shuffled data may be provided to an application.

In some variations, the computer-implemented method may further include accessing a repository including the data implemented as an infocube including a fact table, a dimension table, and a characteristic table. Moreover, the indication representative of whether shuffling is to be performed on at least one of a fact table, a dimension table, or a characteristic table may be received from the user interface. The shuffling may include shuffling at least one column of a fact table. The shuffling may include shuffling at least one column of a dimension table linking a fact table to a characteristic table. The shuffling may include shuffling at least one column of a characteristic table linked to a fact table through a dimension table. The shuffling may include assigning a value in a column to another row in the column. The shuffling may include assigning a value in one of the rows using a dictionary, when the value corresponds to a name. Moreover, the value in the at least one column may be assigned to another row in the at least one column using a random number to determine the other row. The shuffled data may be provided by making the data accessible to the application. The shuffled data may be used to test the application.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In some implementations, the subject matter described herein may be implemented to realize the advantage of making data anonymous to enable the data to be used during testing.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
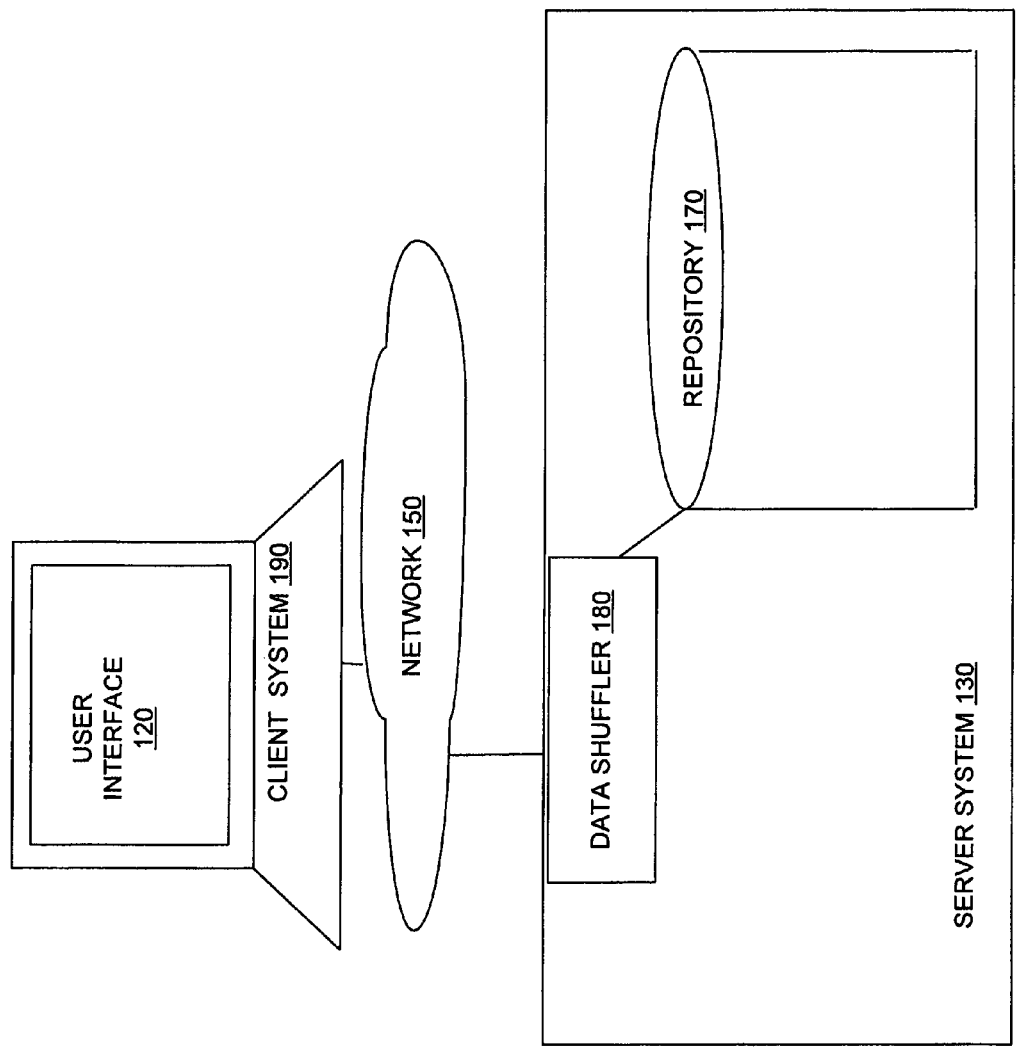
FIG. 1 illustrates a system for shuffling data to make the data anonymous.

FIG. 1 depicts an exemplary system 100 for shuffling structured data, such as data implemented in an infocube (e.g., SAP's infocube). The shuffling of data makes the data anonymous, i.e., lacking distinction or recognizability. As a consequence, the shuffled data may be used during testing of an application, while protecting the confidentiality of the original, un-shuffled data. Moreover, since the shuffled data is actual data rather than simulated, artificial data, using shuffled data rather than artificial data may provide enhanced results during testing of an application, such as a BW including infocubes.

The system 100 includes a client system 190 coupled to a server system 130 through a network 150 (e.g., the Internet or an intranet). The client system 190 and server system 130 may be implemented as a processor, such as a computer, server, and the like.

The client system 190 further includes one or more applications, such as a user interface 120. The user interface 120 may be any application used to interface with other applications, such as programs, services, Web services, and the like. For example, the user interface 120 may include a browser or client application to interface with a data shuffler 180 at server system 130. In some implementations, user interface 120 is implemented as a small application, such as an applet or a Widget, i.e., a JavaScript runtime engine combined with an XML document structure that runs small applications, which can be stored in a repository or any other storage mechanism. In some implementations, the user interface 120 may also be implemented as a business client, such as a Web Dynpro Smart Client or a SAP GUI. The user interface 120 may also have access to one or more services.

The server system 130 includes a repository 170 including structured data, such as objects, business objects, and the like. The term "object" refers to a data structure including at least one of data and related methods, while the phrase "business object" refers to an object used in connection with a business process or task. In some implementations, repository 170 is implemented as a BW (business warehouse) including data structured in infocubes. The infocubes may include fact tables, dimension tables, and characteristic tables.

The server system 130 further includes a data shuffler 180 for shuffling structured data. The term "shuffling" refers to mixing (e.g., mixing to place in a random order). Shuffling may be implemented in various ways. For example, a random number generator may be used to reassign a value in a column to another row in the column. Alternatively, shuffling may be implemented by a so-called "push" approach by reassigning each value in a column to another row (e.g., assigning each value in a column to another row, and the last value in the column is reassigned to the first row of the column). Moreover, if a column contains actual names (e.g., surnames, company names, and the like), the names may be further shuffled using a dictionary of so-called "toy" names (e.g., the surname "Mueller" may be replaced with a dictionary name of "Name0001") to further ensure that the data is anonymous.

In some implementations, data shuffler 180 shuffles data in an infocube by shuffling one or more of the following: shuffling identifiers (IDs) in a fact table, shuffling a portion of a dimension table, and shuffling a portion of a characteristic table (e.g., a master data table).

The data shuffler 180 may be implemented as a program or component, i.e., a small binary object (e.g., an applet) or program that performs a specific function and is designed in such a way to operate easily with other components and applications, such as a database application, BW application, an application testing service, and/or user interface 120. The data shuffler 180 may perform one or more of the following functions: receiving, from a user interface, an indication of a type of shuffling to be performed on data; shuffling the data based on the received indication, so that shuffling rearranges the data to make the data anonymous; and providing the shuffled data to an application. In some implementations, data shuffler 180 is implemented as a service (e.g., as part of SAP's Enterprise Services Framework) or Web service accessible by other applications through an intranet and/or the Internet.

Figure 2:
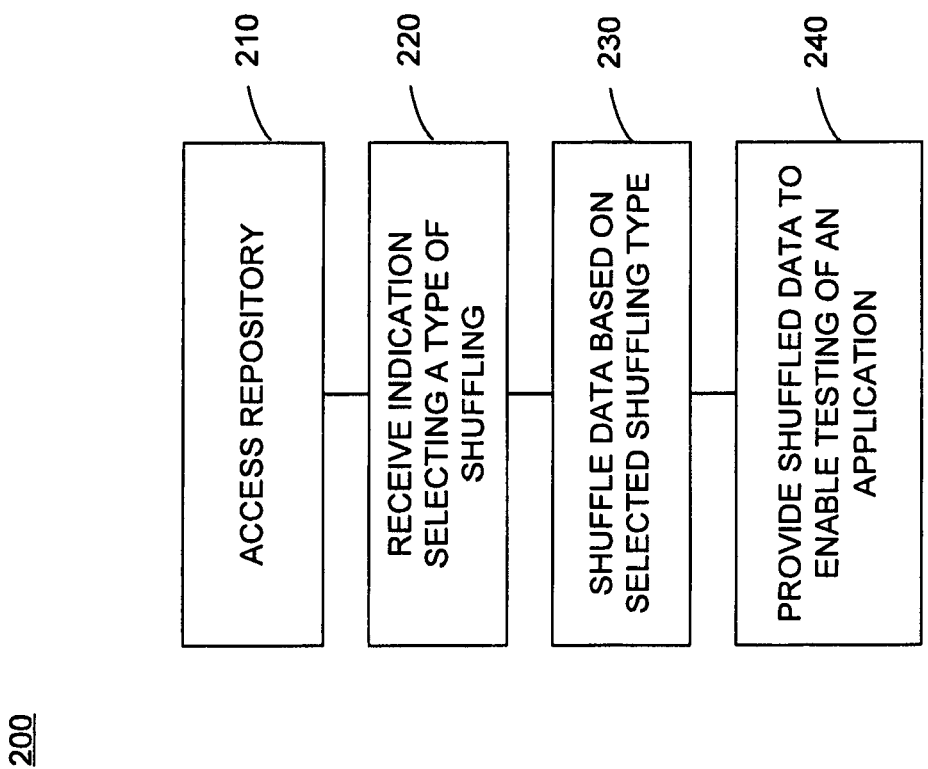
FIG. 2 illustrates a process for shuffling data to make the data anonymous.

FIG. 2 depicts a process for accessing data in a repository. The data may be accessed to make the data anonymous—enabling its use for testing of an application, such as a database application, BW application, service, Web service, and the like. In some implementations, user interface 120 initiates data shuffling by invoking data shuffler 180. For example, user interface 120 may allow a user to select a "start" icon to invoke data shuffler 180, at which time a call (e.g., a message) is sent to server 130 to create an instance of data shuffler 180.

At 210, data shuffler 180 accesses repository 170 including data. In some implementations, the data of repository 170 is structured data, such as objects, business objects, and the like. In other implementations, the data is structured as an infocube. As used herein, an infocube refers to data structured in a multidimensional framework of fact tables, dimension tables, and characteristic tables. Data shuffler 180 may access repository 170 by making a call (e.g., hypertext transfer protocol, SOAP message, and the like).

In some implementation, a user of user interface 120 may be presented with one or more shuffling techniques. The user may select one or more of the techniques presented at user interface 120. User interface 120 may then make a call (including an indication of the selected technique) to data shuffler 180, so that data shuffler 180 may perform the selected shuffles. For example, user interface 120 may present three check boxes corresponding to shuffling identifiers in a fact table, shuffling a portion of a dimension table, and shuffling a portion of a characteristic table, so that a user may select one or more of the shuffling techniques.

At 230, data shuffler 130 shuffles the data in repository 180 based on the received indication of the shuffling technique. For example, if the received indication corresponds to shuffling identifiers in a fact table, the dimension identifiers (IDs) in one or more dimension columns of a fact table are shuffled. If two or more shuffling techniques are selected, then those techniques are also used to shuffle the data.

Figure 3:
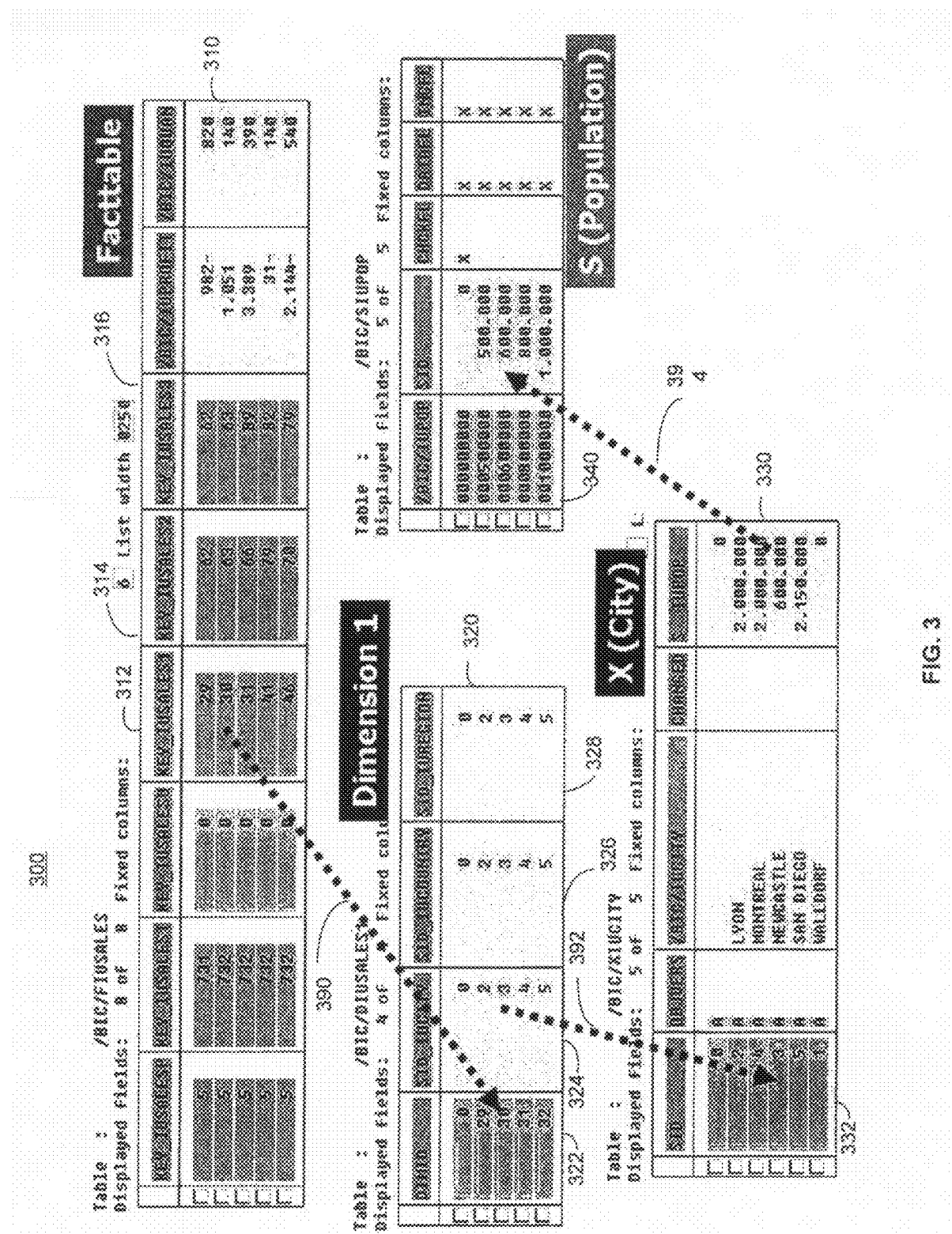
FIG. 3 depicts an example of data processed in accordance with FIG. 2.
Figure 4:
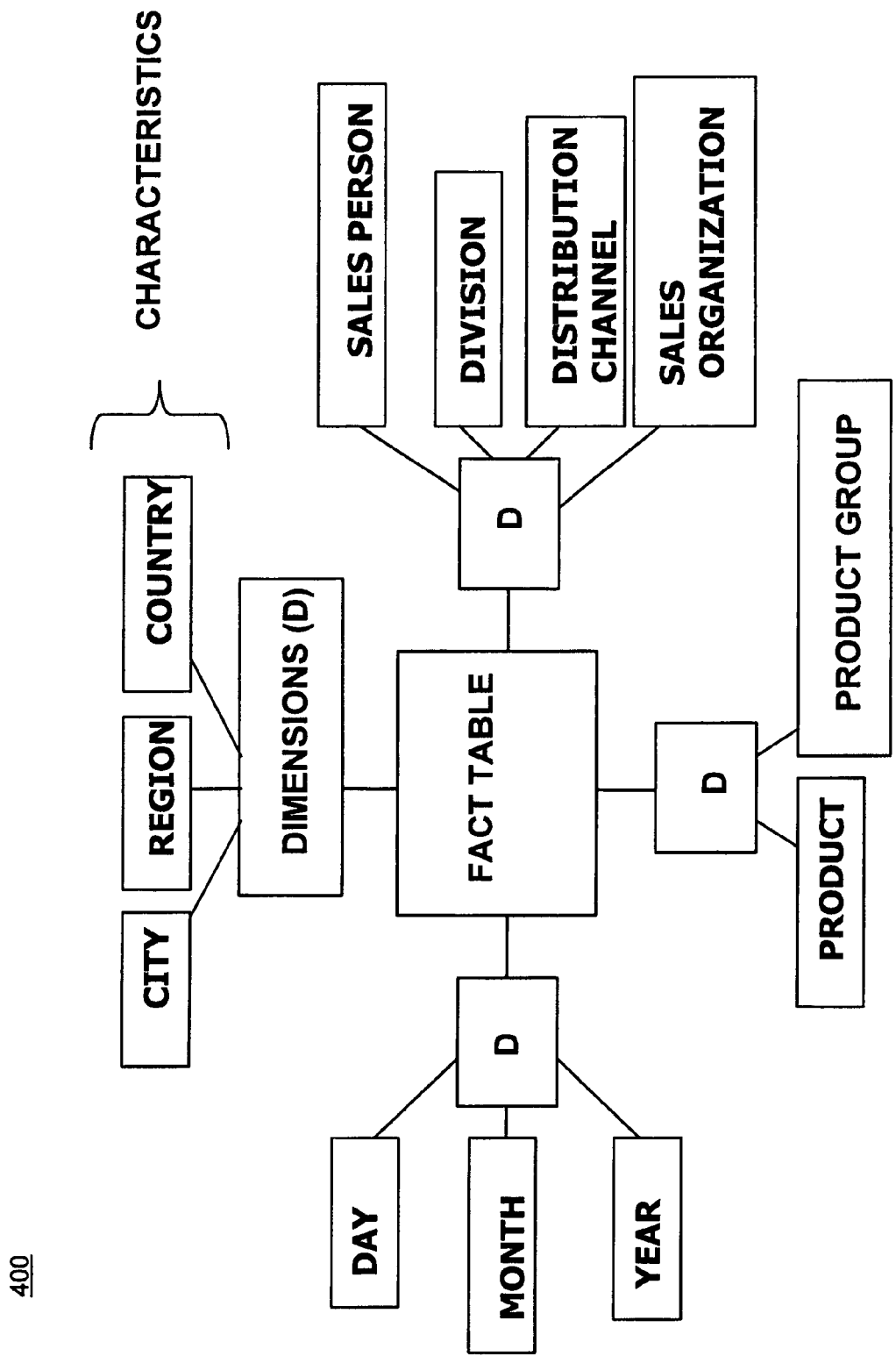
FIG. 4 illustrates an example of a star schema.

FIG. 3 depicts an example of a subset of an infocube 300 including a fact table 310, a dimension table 320, a characteristic table 330 (labeled "X(City)"), and another characteristic table 340 (labeled "S(Population)"). Although FIG. 3 depicts infocube 300 including fact table 310, dimension table 320, and characteristic tables 330-340, infocube 300 may include additional aspects not depicted in FIG. 3 (e.g., additional fact tables, dimension tables, characteristic tables, and the like). Moreover, in some implementations, fact table 310 represents two fact tables (e.g., different layouts with respect to partitioning and column layouts). When this is the case, any shuffling of fact table 310 represents shuffling of both tables.

Referring to infocube 300, it shows an example of a branch of an SAP star schema, which is the underlying physical layout of a BW infocube. An infocube may have several such branches starting from fact table 310 and following foreign key relationships 390-394 to dimension table 320 and characteristic tables 330-340. The given example shows the dimension ID "30" in fact table 310 (see column 312) is resolved via the related dimension table 320. The dimension ID 30 constitutes a combination of surrogate identifiers (SIDs), namely SID "3" for a city (column SID_IUCITY), SID "3" for a region (column SID_IUREGION), and SID "3" for a country (column SID_IUCOUNTRY). Characteristic table 330 (labeled X(City)) then resolves SID "3" for cities and gives a key value of "NEWCASTLE." The resolution of other dimensions and characteristics (e.g., country, region, product, customer, and the like) operates in a similar manner.

The first shuffling technique shuffles one or more dimension columns of a fact table. With this technique, data shuffler 180 shuffles a column associated with dimension identifiers in the fact table. The dimension identifiers represent a tuple (e.g., a combination) of characteristic values. If the characteristics in a dimension represent a strong hierarchy (e.g. day, month, quarter, year), then the dimension identifier is representative of the characteristic value of the lowest granularity (e.g., the "day" in the example above). Shuffling thus rearranges the values of the column.

For example, the column IDs for one or more columns 312-316 (labeled KEY_IUSALES1, KEY_IUSALES2, and Key_lUSSALES3) are shuffled. Table 1 below depicts column 312 before shuffling, and Table 2 depicts column 312 after shuffling.

TABLE 1

| Dimension<br>KEY_IUSALESP | Column 312<br>Dimension 1<br>KEY_IUSALES1 | Key Figure<br>/BIC/<br>IUPROFIT | Key Figure<br>/BIC/IUQUAN |
|---|---|---|---|
| 5 | 29 | −982 | 820 |
| 5 | 30 | 1051 | 140 |
| 5 | 31 | 3389 | 390 |
| 5 | 41 | −31 | 140 |
| 5 | 46 | −2144 | 540 |

TABLE 2

| Dimension<br>KEY_IUSALESP | Column 312<br>Dimension 1<br>KEY_IUSALES1 | Key Figure<br>/BIC/<br>IUPROFIT | Key Figure<br>/BIC/IUQUAN |
|---|---|---|---|
| 5 | 41 | −982 | 820 |
| 5 | 29 | 1051 | 140 |
| 5 | 46 | 3389 | 390 |
| 5 | 30 | −31 | 140 |
| 5 | 31 | −2144 | 540 |

Referring to Table 2, only the dimension identifiers of column 312 are affected by the shuffle performed by data shuffler 180, while other columns, such as key figure data (e.g., actual profit and quantity data) is not affected. This technique may be applied to all dimension columns or to a portion of the columns. In some cases, the default dimensions (e.g., package, time, unit, and the like) may be omitted from any shuffling.

The second technique includes shuffling a portion of a dimension table. To shuffle a portion of the dimension table, data shuffler 180 may shuffle one or more columns of the dimension table. For example, column 322 (labeled DIMID) of dimension table 320 may be shuffled. Alternatively, the non-key columns 324-328 (labeled SID_IUCITY, SID_IUREGION, and SID_IUCOUNTRY) in dimension table 320 may be shuffled. Table 3 depicts dimension column 322 before shuffling, and Table 4 depicts dimension column 322 after shuffling by data shuffler 180. Table 5 depicts shuffling by data shuffler 180 of non-key columns 324-328.

TABLE 3

| Column 322<br>Dimension ID<br>DIMID | SIDs for<br>Characteristic<br>IUCITY<br>SID_IUCITY | SIDs for<br>Characteristic<br>IUCOUNTRY<br>SID_IUCOUNTRY | SIDs for<br>Characteristic<br>IUREGION<br>SID_IUREGION |
|---|---|---|---|
| 0 | 0 | 0 | 0 |
| 29 | 2 | 2 | 2 |
| 30 | 3 | 3 | 3 |
| 31 | 4 | 4 | 4 |
| 32 | 5 | 5 | 5 |

TABLE 4

| Column 322<br>Dimension ID<br>DIMID | SIDs for<br>Characteristic<br>IUCITY<br>SID_IUCITY | SIDs for<br>Characteristic<br>IUCOUNTRY<br>SID_IUCOUNTRY | SIDs for<br>Characteristic<br>IUREGION<br>SID_IUREGION |
|---|---|---|---|
| 0 | 0 | 0 | 0 |
| 32 | 2 | 2 | 2 |
| 31 | 3 | 3 | 3 |
| 30 | 4 | 4 | 4 |
| 29 | 5 | 5 | 5 |

TABLE 5

| Dimension ID<br>DIMID | Column 324<br>SIDs for<br>Characteristic<br>IUCITY<br>SID_IUCITY | Column 326<br>SIDs for<br>Characteristic<br>IUCOUNTRY<br>SID_IUCOUNTRY | Column 328<br>SIDs for<br>Characteristic<br>IUREGION<br>SID_IUREGION |
|---|---|---|---|
| 0 | 0 | 0 | 0 |
| 29 | 5 | 3 | 4 |
| 30 | 3 | 5 | 5 |
| 31 | 2 | 4 | 2 |
| 32 | 4 | 2 | 3 |

The third technique includes shuffling a portion of a characteristic table (e.g., a master data table). To shuffle a portion of the characteristic table, data shuffler 180 may shuffle one or more columns of a master data table. For example, column 332 (labeled "SID") may be shuffled. Table 6 depicts column 332 before shuffling, and Table 7 depicts column 332 after data shuffling by data shuffler 180

TABLE 6

| Column 332<br>Surrogate ID<br>SID | OBJVERS | Key<br>/BIC/IUCITY | <ignore><br>CHANGED | Attribute SID<br>S_IUPOP |
|---|---|---|---|---|
| 0 | A | | | 0 |
| 2 | A | LYON | | 2000000 |
| 4 | A | MONTREAL | | 2000000 |
| 3 | A | NEWCASTLE | | 600000 |
| 5 | A | SAN DIEGO | | 2150000 |
| 1 | A | WALLDORF | | 0 |

TABLE 7

| Column 332<br>Surrogate ID<br>SID | OBJVERS | Key<br>/BIC/IUCITY | <ignore><br>CHANGED | Attribute SID<br>S_IUPOP |
|---|---|---|---|---|
| 0 | A | | | 0 |
| 1 | A | LYON | | 2000000 |
| 5 | A | MONTREAL | | 2000000 |
| 2 | A | NEWCASTLE | | 600000 |

TABLE 7-continued

| Column 332 Surrogate ID SID | Key OBJVERS | /BIC/IUCITY | <ignore> CHANGED | Attribute SID S_IUPOP |
|---|---|---|---|---|
| 3 | A | SAN DIEGO | | 2150000 |
| 4 | A | WALLDORF | | 0 |

Per characteristic, there can be up to three tables (e.g., the so-called S, X, and Y tables) that have a SID column as in Tables 6 and 7 above. Those S, X, and Y tables may be shuffled synchronously. This is caused by the fact that the X and Y tables redundantly incorporate data that is already in the S table. This dependency requires a synchronization step.

At 240, the shuffled data may be provided so that it can be used for testing of an application. For example, a query function of an application may be tested using the shuffled data. Tables 8 depicts an example query with non-shuffled data, while Tables 9-12 depict the results of an example query performed on data shuffled as described above with respect to FIG. 2. Specifically, Table 9 depicts the results of an example query after shuffling the fact table; Table 10 depicts the results of an example query after shuffling the dimension table on the DIMIDs; Table 11 depicts the results of the example query after shuffling the dimension table; and Table 12 depicts the results of an example query after shuffling the master data tables.

TABLE 8

| Key /BIC/IUCITY | Key /BIC/IUCOUNTRY | Key Figure /BIC/IUPROFIT | Key Figure /BIC/IUQUAN |
|---|---|---|---|
| LYON | FR | −982 | 820 |
| NEWCASTLE | UK | 1051 | 140 |
| MONTREAL | CA | 3389 | 390 |

TABLE 9

Fact Table Shuffling

| City Keys /BIC/IUCITY | Country Keys /BIC/IUCOUNTRY | Key Figure /BIC/IUPROFIT | Key Figure /BIC/IUQUAN |
|---|---|---|---|
| LYON | FR | 1051 | 140 |
| NEWCASTLE | CA | −31 | 140 |
| MONTREAL | UK | −2144 | 540 |

TABLE 10

Dimension Table Shuffling (1)

| City Keys /BIC/IUCITY | Country Keys /BIC/IUCOUNTRY | Key Figure /BIC/IUPROFIT | Key Figure /BIC/IUQUAN |
|---|---|---|---|
| SAN DIEGO | US | −982 | 820 |
| MONTREAL | CA | 1051 | 140 |
| NEWCASTLE | UK | 3389 | 390 |

TABLE 11

Dimension Table Shuffling (2)

| City Keys /BIC/IUCITY | Country Keys /BIC/IUCOUNTRY | Key Figure /BIC/IUPROFIT | Key Figure /BIC/IUQUAN |
|---|---|---|---|
| SAN DIEGO | UK | −982 | 820 |
| NEWCASTLE | US | 1051 | 140 |
| LYON | CA | 3389 | 390 |

TABLE 12

Master Data Table Shuffling

| City Keys /BIC/IUCITY | Country Keys /BIC/IUCOUNTRY | Key Figure /BIC/IUPROFIT | Key Figure /BIC/IUQUAN |
|---|---|---|---|
| NEWCASTLE | UK | −982 | 820 |
| SAN DIEGO | US | 1051 | 140 |
| WALLDORF | DE | 3389 | 390 |

Although the above describes three techniques for shuffling data, more or fewer shuffling techniques may be used as well. Moreover, although the above describes shuffling info-cube data, other types of data may be shuffled as well.

In some implementations, the use the above described shuffling techniques enables the use of actual, production data during testing, while protecting sensitive information by shuffling data to make it anonymous.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A computer-readable storage medium containing instructions to configure a processor to perform a method, the method comprising:
   receiving, from a user interface, an indication of a type of shuffling to be performed on data, wherein the indication is representative of whether shuffling is to be performed on at least one of a fact table, a dimension table, or a characteristic table;
   shuffling the data based on the received indication of the shuffling type, the shuffling arranging the data to make the data anonymous, wherein the shuffling further comprises assigning a value in at least one column using a dictionary, when the value corresponds to a name; and
   providing the shuffled data to an application.

2. The computer-readable storage medium of claim 1 further comprising:
   accessing a repository including the data implemented as an infocube including a fact table, a dimension table, and a characteristic table.

3. The computer-readable storage medium of claim 1, wherein shuffling the data further comprises:
   shuffling at least one column of a fact table.

4. The computer-readable storage medium of claim 1, wherein shuffling the data further comprises:
   shuffling at least one column of a dimension table linking a fact table to a characteristic table.

5. The computer-readable storage medium of claim 1, wherein shuffling the data further comprises:
   shuffling at least one column of a characteristic table linked to a fact table through a dimension table.

6. The computer-readable storage medium of claim 1, wherein shuffling the data further comprises:
   assigning a value in at least one column to another row in the at least one column.

7. The computer-readable storage medium of claim 1, wherein shuffling the data further comprises:
   assigning a value in at least one column to another row in the at least one column using a random number to determine the other row.

8. The computer-readable storage medium of claim 1, wherein providing further comprises:
   providing the shuffled data by making the data accessible to the application, the shuffled data used to test the application.

9. A computer-implemented method comprising:
   receiving, from a user interface, an indication of a type of shuffling to be performed on data, wherein the indication is representative of whether shuffling is to be performed on at least one of a fact table, a dimension table, or a characteristic table;
   shuffling the data based on the received indication of the shuffling type, the shuffling arranging the data to make the data anonymous, wherein the shuffling further comprises assigning a value in at least one column using a dictionary, when the value corresponds to a name; and
   providing the shuffled data to an application, wherein at least one of the receiving, the shuffling, and the providing are implemented on at least one processor.

10. The computer-implemented method of claim 9 further comprising:
    accessing a repository including the data implemented as an infocube including a fact table, a dimension table, and a characteristic table.

11. The computer-implemented method of claim 9, wherein shuffling the data further comprises:
    shuffling at least one column of a fact table.

12. The computer-implemented method of claim 9, wherein shuffling the data further comprises:
    shuffling at least one column of a dimension table linking a fact table to a characteristic table.

13. The computer-implemented method of claim 9, wherein shuffling the data further comprises:
    shuffling at least one column of a characteristic table linked to a fact table through a dimension table.

14. The computer-implemented method of claim 9, wherein shuffling the data further comprises:
    assigning a value in at least one column to another row in the at least one column.

15. The computer-implemented method of claim 9, wherein shuffling the data further comprises:
    assigning a value in at least one column to another row in the at least one column using a random number to determine the other row.

16. The computer-implemented method of claim 9, wherein providing further comprises:
    providing the shuffled data by making the data accessible to the application, the shuffled data used to test the application.

17. A system comprising:
    a processor; and
    a memory, wherein the processor and the memory are configured to perform a method comprising:
    receiving, from a user interface, an indication of a type of shuffling to be performed on data, wherein the indication is representative of whether shuffling is to be performed on at least one of a fact table, a dimension table, or a characteristic table;
    shuffling the data based on the received indication of the shuffling type, shuffling the data to rearrange the data to make the data anonymous, wherein the shuffling further comprises assigning a value in at least one column using a dictionary, when the value corresponds to a name; and
    providing the shuffled data to an application.

* * * * *